United States Patent
Kobayashi

(10) Patent No.: US 8,386,579 B2
(45) Date of Patent: Feb. 26, 2013

(54) BIT SELECTION CIRCUIT IN AN IMAGE OR COMMUNICATION PROCESSING APPARATUS THAT ARBITRARILY SELECTS CONTINOUS BITS

(75) Inventor: Hiroshi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 933 days.

(21) Appl. No.: 12/457,315

(22) Filed: Jun. 8, 2009

(65) Prior Publication Data

US 2010/0017448 A1    Jan. 21, 2010

(30) Foreign Application Priority Data

Jul. 15, 2008    (JP) ................................. 2008-184205

(51) Int. Cl.
*G06F 7/00*    (2006.01)
(52) U.S. Cl. ........................................ 709/209; 708/518
(58) Field of Classification Search .................. 708/209, 708/518
See application file for complete search history.

(56) References Cited

U.S. PATENT DOCUMENTS

| 4,653,019 | A  | * | 3/1987 | Hodge et al. | 708/209 |
| 5,818,894 | A  | * | 10/1998 | Song | 377/69 |
| 5,933,536 | A  | * | 8/1999 | Fukuzawa | 382/246 |
| 6,877,019 | B2 | * | 4/2005 | Bandy et al. | 708/209 |
| 7,693,337 | B2 | * | 4/2010 | Strom et al. | 382/233 |
| 2001/0009010 | A1 | * | 7/2001 | Sugeno et al. | 708/209 |

FOREIGN PATENT DOCUMENTS

JP    10-164596    6/1998

* cited by examiner

*Primary Examiner* — Tammara Peyton

(74) *Attorney, Agent, or Firm* — Rader, Fishman & Grauer PLLC

(57) ABSTRACT

A bit selection circuit that arbitrarily selects, from among ($2^n$) input bits, ($2^{n-1}$) continuous output bits in the input bit arrangement (where $n \geq 3$), includes: a first multiplexer selecting $\{(2^n-2)-(2^0+2^1+\ldots+2^{n-3})\}$ continuous bits in the input bit arrangement from among ($2^n-2$) input bits, excluding two first and ($2^n$)th input bits at both ends in the input bit arrangement, in accordance with an input first control signal; and a second multiplexer selecting ($2^{n-1}$) continuous output bits in the input bit arrangement from among the $\{(2^n-2)-(2^0+2^1+\ldots+2^{n-3})\}$ bits selected by the first multiplexer, the first input bit, and the ($2^n$)th input bit in accordance with an input second control signal.

4 Claims, 10 Drawing Sheets

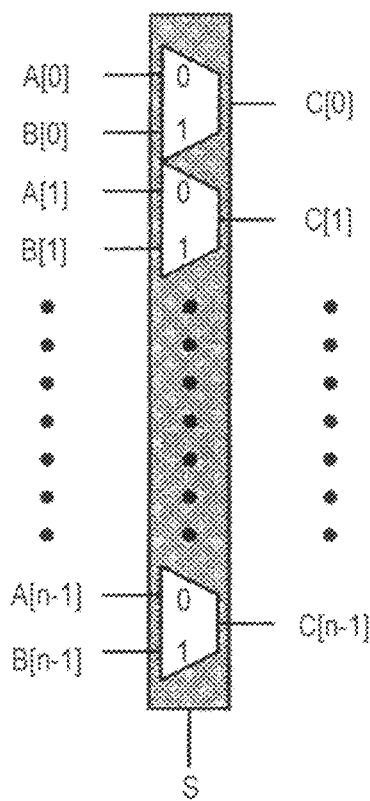

BIT SELECTION CIRCUIT IN AN IMAGE OR COMMUNICATION PROCESSING APPARATUS THAT ARBITRARILY SELECTS CONTINOUS BITS

BACKGROUND OF THE INVENTION

1. Field of the Invention

The present invention relates to a bit selection circuit that selects arbitrary continuous $2^{n-1}$ bits from among $2^n$ bits.

2. Description of the Related Art

A circuit that selects arbitrary continuous $2^{n-1}$ bits from among $2^n$ bits is used in, for example, image processing or processing for communication.

For example, in the image processing, when a part of an image region is extracted, a processing to select arbitrary continuous $2^{n-1}$ pixels from among $2^n$ continuous pixels is performed. In order to implement hardware for executing this processing, it is necessary to arrange circuits for selecting arbitrary continuous $2^{n-1}$ bits from among $2^n$ bits to correspond to the number of pixels. As the number of circuits increases, the scale of the entire bit selection circuit increases. Accordingly, there is a need for a technique that can implement a circuit of a smaller scale.

As a specific example, a technique is known in which barrel shifter is used in order to extract a macro block of 8×8 pixels having information about luminance or color difference from a block of 16×16 pixels defined by the MPEG (Motion Picture Experts Group) standard in a circuit for motion detection (for example, see JP-A-10-164596).

In JP-A-10-164596, by a combination of a register (REG) for accumulating data from a memory in a word (8 bits) unit and a barrel shifter, a circuit is implemented which extracts an image block (macro block) of a smaller range from an image block of a larger scale, while shifting a search range, and inputs the extracted image block to a subsequent-stage pipeline processing unit as the arrangement of continuous bits, thereby extracting a macro block.

SUMMARY OF THE INVENTION

Although a detailed circuit configuration is not described in JP-A-10-164596, in a bit selection circuit, such as a barrel shifter or the like, which has a function to shift, from the arrangement of continuous input bits, continuous bits in the corresponding arrangement, and a function to select continuous bits after being shifted, the larger number of input bits causes an increase in the circuit scale and an increase in power consumption.

Thus, it is desirable to implement a bit selection circuit that has a configuration for further reduction in the circuit scale or power consumption even with the same number of input bits, and selects continuous bits with a smaller bit width (the number of bits) from among input bits.

A first embodiment of the invention is directed to a bit selection circuit that arbitrarily selects, from among ($2^n$) input bits, ($2^{n-1}$) continuous output bits in the input bit arrangement (where $n \geq 3$). The bit selection circuit includes a first multiplexer selecting $\{(2^n-2)-(2^0+2^1+\ldots+2^{n-3})\}$ continuous bits in the input bit arrangement from among ($2^n-2$) input bits, excluding two first and ($2^n$)th input bits at both ends in the input bit arrangement, in accordance with an input first control signal, and a second multiplexer selecting ($2^{n-1}$) continuous output bits in the input bit arrangement from among the $\{(2^n-2)-(2^0+2^1+\ldots+2^{n-3})\}$ bits selected by the first multiplexer, the first input bit, and the ($2^n$)th input bit in accordance with an input second control signal.

A second embodiment of the invention is directed to the bit selection circuit according to the first embodiment of the invention, wherein the first multiplexer may be an at least one-stage barrel shift selection circuit, the i-th stage (where $i=1, 2, \ldots, n-2$) of which has arranged therein ($2^n-2^i-1$) 2:1 selection circuits, each 2:1 selection circuit selecting one bit from among two bits of the input bits or two bits, which are output from a previous stage, in accordance with the first control signal and outputting the one bit to a subsequent stage. The second multiplexer may have an input stage having arranged therein ($2^n-2^{n-1}+1$) 2:1 selection circuits selecting one bit from among all the bits, which are output from the first multiplexer, the first input bit, and the ($2^n$)th input bit in accordance with the second control signal and outputting the one bit, and an output stage having arranged therein ($2^{n-1}$) 2:1 selection circuits, each 2:1 selection circuit selecting one bit from among two bits, which are output from two adjacent 2:1 selection circuits in the input stage, in accordance with the second control signal and outputting the one bit as one of the output bits.

A third embodiment of the invention is directed to the bit selection circuit according to the second embodiment of the invention, wherein in the arrangement of the ($2^n-2^i-1$) 2:1 selection circuits constituting the i-th stage of the first multiplexer, interstage connection of 2:1 selection circuits between a ($2^i$)th 2:1 selection circuit when counted from one end and a ($2^i$)th 2:1 selection circuit when counted from the other end may be made by two input lines, which are configured to individually receive two adjacent input bits or two bits to be output from two 2:1 selection circuits spaced with a ($2^{i-1}$) pitch in a previous stage, and an output line, which has a two-way shift configuration to simultaneously output the selected one bit to two 2:1 selection circuits spaced with a ($2^i$) pitch in a subsequent stage and functions as one of the input lines with respect to each of 2:1 selection circuits as shift destinations in the corresponding subsequent stage. Interstage connection of $\{(2^i-1) \times 2\}$ 2:1 selection circuits at both ends in the i-th stage may be made by the two input lines and an output line, which has a one-way shift configuration to output the selected one bit to one 2:1 selection circuit in one way in a subsequent stage and functions as the input lines, together with the output line.

Fourth and fifth embodiments of the invention are directed to the bit selection circuit according to the second and third embodiments of the invention, wherein, if the first input bit, the ($2^n-2$) bits output from the final stage of the first multiplexer, and the ($2^n$)th input bit are arranged in that order, the input lines of each of the ($2^n-2^{n-1}+1$) 2:1 selection circuits constituting the input stage of the second multiplexer may be configured to receive two bits spaced with a pitch of four bits in the corresponding arrangement. The input lines of each of the ($2^{n-1}$) 2:1 selection circuits constituting the output stage of the second multiplexer may be configured to receive two bits, which are output from two adjacent 2:1 selection circuits in the input stage.

In the first to fifth embodiments of the invention, the bit selection circuit includes the first multiplexer and the second multiplexer. Of these, the first multiplexer selects and outputs a predetermined number of bits from among a group of input bits, excluding two bits at both ends in the arrangement of the ($2^n$) input bits. A predetermined number of bits vary depending on the value "n". That is, the first multiplexer selects $\{(2^n-2)-(2^0+2^1+\ldots+2^{n-3})\}$ continuous bits from the input bit arrangement (where $n \geq 3$).

With this multiplexer, the larger number of input bits causes an increase in the circuit scale. In particular, as the value n becomes larger, the increment of the circuit scale rapidly increases.

In contrast, according to the embodiments of the invention, since two input bits are reduced, the circuit scale of the first multiplexer is further reduced. As the value n is larger, the reduction effect increases. In particular, when the value n is comparatively large, only by reducing two input bits, the circuit scale is considerably reduced.

According to the embodiments of the invention, the second multiplexer is further provided to input two bits, which are excluded at the time of the input of bits, in addition to the selection result of the first multiplexer. In this case, since the circuit scale of the second multiplexer does not exceed the decrement of the circuit scale by reduction of two input bits in the first multiplexer, the total circuit scale of the first and second multiplexers is reduced.

When the bit selection circuit has a multi-stage configuration of 2:1 selection circuits, if the value n is 4, the number of 2:1 selection circuits for repetition of 2:1 selection using all ($2^4$) input bits from an initial stage is 60 in total.

In contrast, like the second to fifth embodiments of the invention, when the bit selection circuit is divided into the first multiplexer and the second multiplexer, if the value n is 4, the total number of 2:1 selection circuits becomes 45.

According to the embodiments of the invention, a bit selection circuit can be implemented which has a configuration for further reduction in the circuit scale or power consumption even with the same number of input bits, and selects continuous bits with a smaller bit width from among input bits.

BRIEF DESCRIPTION OF THE DRAWINGS

FIG. 6 is a definition diagram of input and output with respect to the arrangement of 2:1 selection circuits according to Embodiment 2 of the invention;

FIG. 7 is a chart showing the relationship between a control signal and output bits according to Embodiment 2 of the invention;

DETAILED DESCRIPTION OF THE INVENTION

Hereinafter, embodiments of the invention will be described with reference to the drawings.

Embodiment 1

Figure 1:
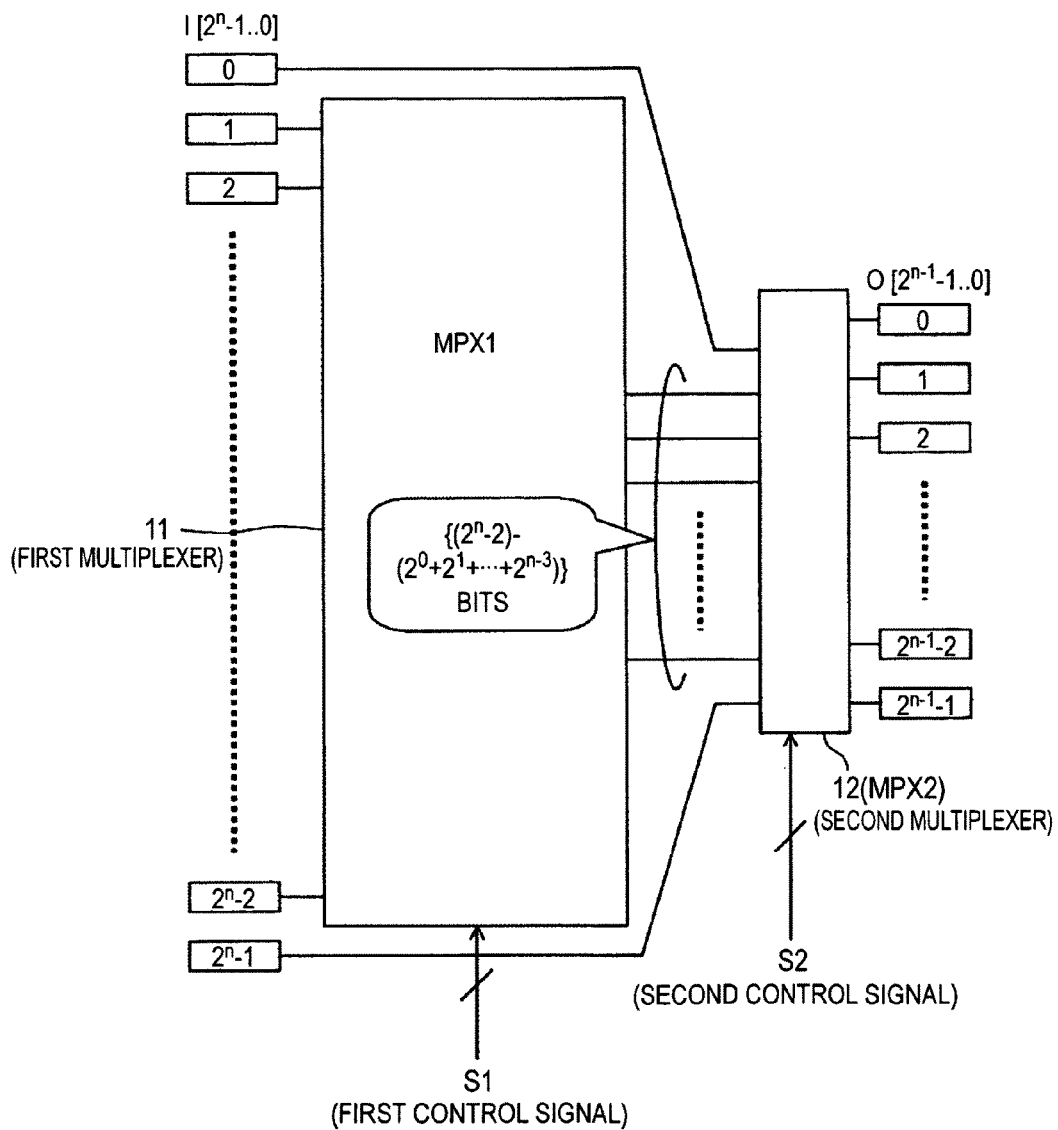
FIG. 1 is a conceptual block diagram showing a bit selection circuit according to Embodiment 1 of the invention.

FIG. 1 shows a conceptual block diagram of this embodiment.

A bit selection circuit 10 shown in FIG. 1 is a circuit that arbitrarily selects, from among ($2^n$) input bits $I[2^n-1 \ldots 0]$, ($2^{n-1}$) continuous output bits $O[2^{n-1}-1 \ldots 0]$ in the input bit arrangement. The value "n" is a natural number of 3 or more, and it may be arbitrarily set depending on the purpose of the corresponding circuit.

The bit selection circuit 10 has a first multiplexer (MPX1) 11 and a second multiplexer (MPX2) 12, each having a barrel shift function and a bit selection function.

In the arrangement of the input bits $I[2^n-1 \ldots 0]$, a first input bit $I[0]$ and a ($2^n$)th input bit $I[2^n-1]$ are input to the second multiplexer 12.

($2^n-2$) input bits $I[1 \ldots 2^n-2]$, excluding the two input bits $I[0]$ and $I[2^{n-1}]$ at both ends, are input to the first multiplexer 11.

The first multiplexer 11 is a circuit that selects from among the ($2^n-2$) input bits $I[1 \ldots 2^n-2]$, $\{(2^n-2)-(2^0+2^1+\ldots+2^{n-3})\}$ continuous bits in the input bit arrangement in accordance with an input first control signal S1.

The second multiplexer 12 is a circuit that selects, from among the $\{(2^n-2)-(2^0+2^1+\ldots+2^{n-3})\}$ bits selected by the first multiplexer 11, the first input bit $I[0]$, and the ($2^n$)th input bit $I[2^n-1]$, ($2^{n-1}$) continuous output bits $O[2^{n-1}-1 \ldots 0]$ in the input bit arrangement in accordance with an input second control signal S2.

The operation in the circuit is defined by the specific configuration of the first multiplexer 11 and the second multiplexer 12. In this case, it is characterized that the bit selection circuit has the above-described two multiplexers.

Next, operations and effects of the bit selection circuit 10 shown in FIG. 1 will be described.

It is considered that the same function as the bit selection circuit 10 shown in FIG. 1 is implemented by one multiplexer, which has a function of barrel shifter and bit selection in order to receive ($2^n$) bits and to arbitrarily select ($2^{n-1}$) continuous output bits in the input bit arrangement. For convenience, this circuit is called "a circuit of a first comparative example". The circuit of the first comparative example is equivalent to a case where, in the first multiplexer 11 of FIG. 1, two input bits increase, and the number of output bits is ($2^n-2$).

In the multiplexer having such configuration (the circuit of the first comparative example) and the first multiplexer 11, the larger number of input bits causes an increase in the circuit scale. In particular, as the value n becomes larger, the increment of the circuit scale rapidly increases.

In contrast, in this embodiment, since two input bits are reduced in the first multiplexer 11, the circuit scale of the first multiplexer 11 is reduced less than the circuit of the first comparative example. As the value n is larger, the reduction effect increases. In particular, when the value n is comparatively large, only by reducing two input bits, the circuit scale is considerably reduced.

In this embodiment, the second multiplexer 12 is further provided to input two bits, which are excluded at the time of the input of bits, in addition to the selection result of the first multiplexer 11. In this case, the circuit scale of the second multiplexer 12 does not exceed the decrement of the circuit scale by reduction of two input bits in the first multiplexer 11.

Therefore, the total circuit scale of the first and second multiplexers 11 and 12 is reduced less than the circuit of the first comparative example.

As a result, the bit selection circuit 10 of this embodiment has a small circuit scale for the number of input bits, and achieves low power consumption.

The bit selection circuit of this embodiment may be used for the purpose of selection of continuous bits in an image processing, or a reception or transmission processing for communication. There is no limitation to the purposes of the bit selection circuit.

Embodiment 2

Embodiment 2 shows an example where the bit selection circuit of Embodiment 1 is used as a block matching circuit for motion detection of a motion image.

First, the overview of block matching will be described.

The purposes of motion detection include motion image compression, image stabilization, and the like.

In the case of motion image compression, data of an image to be compressed (target image) is compared with reference image data at high speed, and a motion vector is generated from the comparison result. Reference image data indicated by the generated motion vector is subtracted from target image data. Differential data is used in a predetermined image compression processing through DCT (Discrete Cosine Transform), quantization, RL (Run Length Coding), VLC (Variable Length Code), or the like. In this way, compressed data of the target image is generated.

In the case of image stabilization, a motion vector, which is generated in the same manner as described above, is used in estimation of a shake vector of the entire screen including an image subject to image stabilization.

In any case, the same method of generating a motion vector is used, and this method is carried out as described in the following <Motion Detection>.

<Motion Detection>

For example, according to the MPEG standard, data of an image (target image) subject to motion detection is given in a unit of pixel for 2×2 blocks, each block including 8×8 pixels (1 word×8 lines), that is, in a unit of 16×16 pixel data in total. In the MPEG standard, an image range corresponding to continuous 16×16 pixel data in an X direction (word direction) and a Y direction (line direction) is called a "macro block".

In a block matching scheme, a target image is divided in a macro block unit, and a circuit for block matching is provided for each macro block.

Within this circuit, a target image is compared with a reference image, which is an image temporally before one frame (or before two or more frames). A processing for comparison is performed in a macro block unit. That is, it is determined which macro block in the target image is similar to which macro block in the reference image. As the value representing the similarity, in general, an evaluation value, such as an SAD (Sum of Absolute Difference), an SSD (Sum of Squared Difference), or the like, is obtained, and a block having a smaller evaluation value is selected. A vector corresponding the selected block is set as a motion vector in the target image block.

The above-described processing for comparison is executed as follows. In this case, the SAD is used as the evaluation value.

A block in the target image (target image block) is compared with a block in the reference image (for example, reference image block of 16×16 pixels) in a range about a macro block with the same address as the reference image block. A comparison range in the reference image is called a "search range". When the macro block is of 16×16 pixels, a shift in a minus direction for 16 pixels (represented by "−16") and a shift in a plus direction for 16 pixels (simply, represented by "16") can be made in each of the X direction and the Y direction, and thus the search range is also called a "search range of −16 to 16 pixels".

For the definition of the search range, with respect to one target image block, image comparison may be carried out while changing an image block to be compared in the search range of −16 to 16 pixels, for example. To the contrary, with respect to one reference image block, image comparison may be carried out while changing a target image block in the search range of −16 to 16 pixels.

In any case, one of the reference image block and the target image block is repeatedly shifted and compared with the other one within the search range. With this comparison, the evaluation value is calculated. A sequence of shift, comparison, and calculation of the evaluation value is called "search".

With respect to calculation of the evaluation value, for example, when the evaluation value is an SAD, the cumulative sum of a difference (absolute value) in the pixel value is set as the evaluation value for the image comparison, and a smallest evaluation value (hereinafter, referred to as a minimum value) is calculated. A vector between the target image block and the reference image block when the minimum value is obtained is certified as a motion vector.

While the minimum value, such as the SAD or the like, is calculated in a macro block unit, selection of a macro block to be compared (a shift and sampling operation) does not need to be carried out in a macro block unit, and it may be carried out for each pixel to the minimum. In order to increase the detection accuracy of the motion vector, the macro block of the target image is shifted in one pixel unit to the minimum and sampled, and the minimum evaluation value is calculated for each sampled block. Though the details are not provided, the minimum evaluation value may be calculated in a half-pixel unit by calculation.

In this method, however, if the image size is large, the amount of calculation becomes enormous. For this reason, preferably, hierarchical search is carried out, in which coarse search, called coarse-grain search, is carried out to narrow the range, and then more accurate fine-grain search (search with one pixel shift) is carried out.

In the hierarchical search, initial coarse-grain search is carried out in a predetermined pixel step larger than one pixel, such as a unit of 2's power (2, 4, 8, . . . ) pixels or the like. For example, if search is carried out with the shift amount for every 2, 4, 8, . . . pixels, the amount of calculation when the minimum evaluation value is calculated is proportional to the number of evaluation values to be calculated, and roughly becomes ¼, ¹⁄₁₆, and ¹⁄₆₄, respectively. Accordingly, the minimum evaluation value calculated through coarse-grain search is equivalent to the minimum evaluation value which is obtained when search is carried out with respect to the compressed image.

Fine-grain search is carried out with a one-pixel shift in a smaller range where the minimum evaluation value calculated through coarse-grain search is obtained. With this search, the minimum evaluation value is calculated with higher accuracy.

According to this method, the amount of calculation can be reduced. From another viewpoint, with the application of this method, the range of block matching can be reduced in order to reduce the circuit scale, and motion vector detection can be carried out in a wide region larger than the range.

Moreover, the hierarchical search is not limited to the above-described two-step search.

<Example of Circuit Block Configuration>

In the block matching method, the motion detection range is limited to, for example, the search range of −16 to 16 pixels, as described above. For this reason, it should suffice that, with respect to an image range wider than −16 to 16 pixels, a rough motion vector is obtained by using a block compression circuit, and then an accurate motion vector is obtained in a narrower range. In this case, the hierarchical search method is basically used. That is, search is carried out with respect to the compressed image to narrow the range where the minimum evaluation value (minimum value) exists (coarse-grain search) and finally search is carried out with respect to uncompressed image in the narrowed range (fine-grain search).

Figure 2:
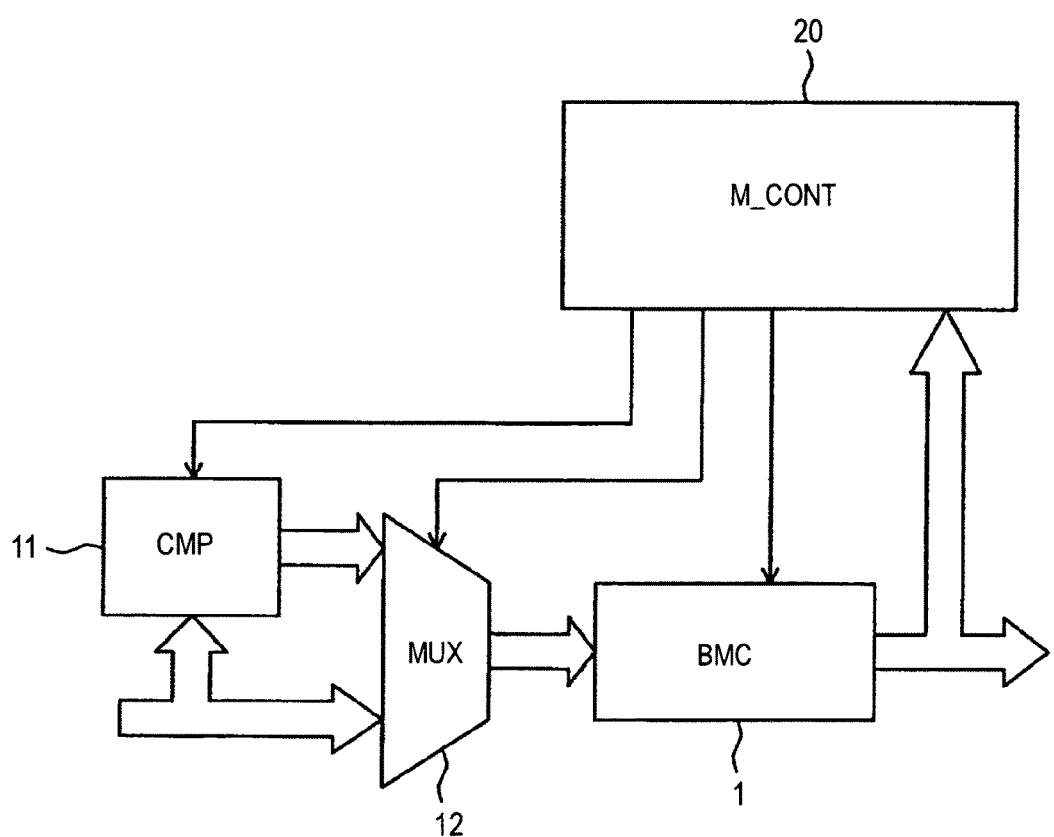
FIG. 2 is a block diagram showing the essential configuration of an image processing apparatus according to Embodiment 2 of the invention.
Figure 3:
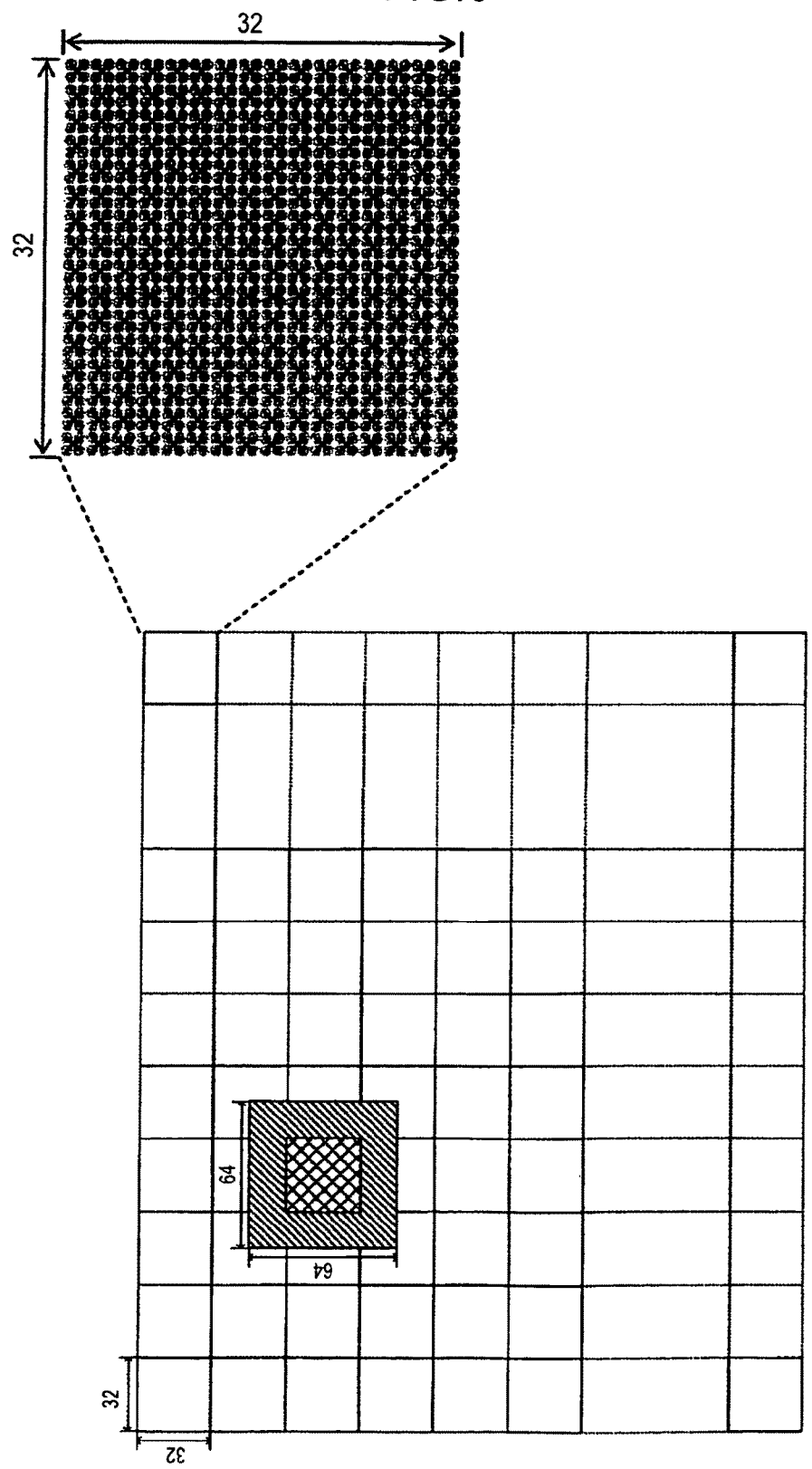
FIG. 3 is a diagram showing an example of a range of image compression in the image processing apparatus according to Embodiment 2 of the invention.

FIG. 2 is a block diagram showing the essential configuration of an image processing apparatus using a block compression circuit. FIG. 3 is a diagram showing an example of a range of image compression.

The image processing apparatus shown in FIG. 2 has a block matching circuit 1, and two circuits disposed on the input side of the block matching circuit 1, that is, a block compression circuit (CMP) 11 and a multiplexer (MUX) 12. The image processing apparatus shown in FIG. 2 also has a main control circuit (M_CONT) 20, such as a CPU, a microcomputer, or the like.

The main control circuit 20 overall controls the block matching circuit 1, the block compression circuit 11, and the multiplexer 12. If an image memory (not shown) for storing images for several frames is provided, the main control circuit 20 also controls data input/output with respect to the image memory, address generation of data to be read, and the like.

The block compression circuit 11 is a circuit that compresses image data input from the image memory (not shown) with a predetermined compression ratio. Compression is carried out in order to reduce the number of bits of block matching, thereby reducing a circuit load of the block matching circuit 1.

In an example shown in FIG. 3, the block compression circuit 11 compresses a region of 64×64 pixels to a region of 32×32 pixels, and compresses an image region of 32×32 pixels to an image region of 16×16 pixels. If the search range is set to the compressed region from 64×64 pixels to 32×32 pixels, a region of 32×32 pixels at the center of the search range is compressed to an image region of 16×16 pixels. The image region of 16×16 pixels may be shifted in one pixel unit in each of the X direction and the Y direction within the search range for search. In the compression, for example, addition of 2×2 pixels is used and lower-level two bits are subject to quantization by cutoff.

The multiplexer 12 selectively outputs compressed image data through the block compression circuit 11 and uncompressed image data having not passed through the block compression circuit 11 to the block matching circuit 1 under the control of the main control circuit 20.

The block matching circuit 1 generates a motion vector by the method described in <Motion Detection>.

Hereinafter, a motion detection operation of the image processing apparatus shown in FIG. 2 will be schematically described.

The block matching circuit 1 initially obtains a motion vector from compressed image data through the block compression circuit 11 with coarse accuracy under the control of the main control circuit 20.

In detail, compressed target image data from 32×32 pixels to 16×16 pixels (see FIG. 3) is input from the block compression circuit 11, and target image data is compared with predetermined reference image data within a search range compressed from 64×64 pixels to 32×32 pixels. Input of compressed image data is carried out when the multiplexer 12 selects a data input path through the block compression circuit 11 under the control of the main control circuit 20. The block matching circuit 1 repeats comparison of image data while shifting target image data within the search range compressed to 32×32 pixels in accordance with a predetermined sequence. In this search, even if search is carried out in one pixel unit with respect to the image region of 32×32 pixels, since each pixel corresponds to two pixels in the original image region of 64×64 pixels, it may be impossible to carry out accurate search in one pixel unit. In this case, for example, rough search (coarse-grain search) is carried out in a prescribed unit, such as one pixel, two pixels, or four pixels after being compressed.

The block matching circuit 1 obtains the minimum value from among a plurality of evaluation values obtained as the search result. In this way, target image data (macro block data of 16×16 pixels) corresponding to the minimum value is specified.

Subsequently, the block matching circuit 1 inputs data corresponding to the specified macro block of 16×16 pixels (a region of ±8 pixels) again, without passing through the block compression circuit 11. This is carried out when the multiplexer 12 selects a data input path not passing through the block compression circuit 11 in advance under the control of the main control circuit 20.

Next, a motion vector is obtained in the specified macro block of 16×16 pixels with high accuracy, for example, in one pixel unit. As described above, search is carried out in the given range a possible number of times, and the minimum evaluation value (minimum value) is obtained from the search result. A vector between the reference image and the target image corresponding to the obtained minimum value is certified as a motion vector.

When the "evaluation value" is an SAD, a difference in the luminance value between a prescribed evaluation block and a block for comparison with the evaluation block is calculated for each pixel, and a cumulative value of the difference in the luminance value in the block is calculated. In the macro block, the range of the target image is changed, for example, in one pixel unit, if possible, such that calculation of the cumulative value is repeated with this change. The minimum of a plurality of cumulative values obtained in such a manner is set as the minimum value.

The motion vector is obtained from the minimum value. When the motion vector is large, it is determined to be "motion image", and when the motion vector is small, it is determined to be "still image". Therefore, an image processing suitable for each of "motion image" and "still image" is subsequently performed.

Figure 4:
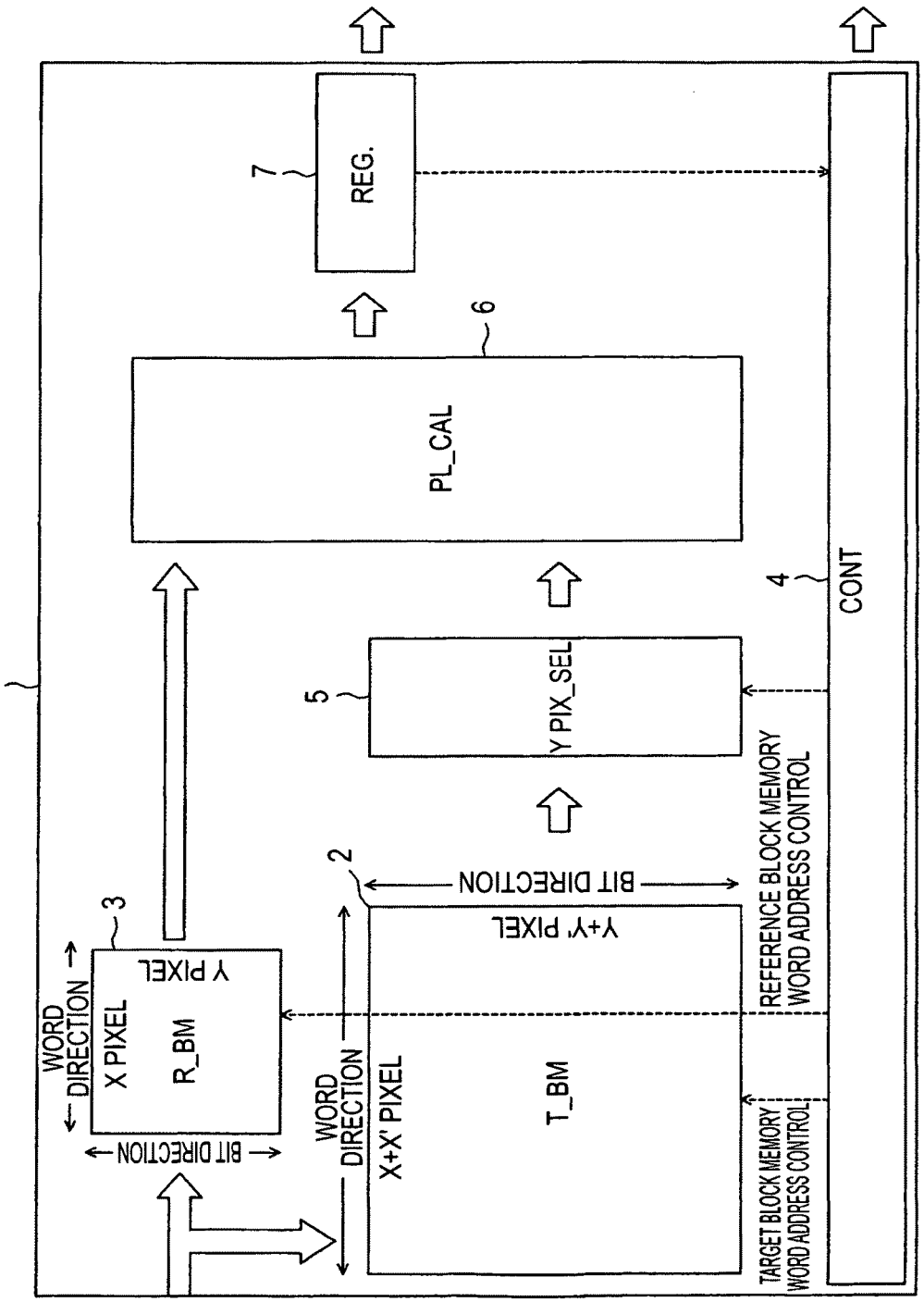
FIG. 4 is a diagram showing the configuration of a block matching circuit according to Embodiment 2 of the invention.

FIG. 4 shows the block configuration of the block matching circuit for motion detection.

The block matching circuit 1 shown in FIG. 4 has a target block memory (T_MB) 2 updatably storing a target image block for each predetermined range, a reference block memory (R_MB) 3 updatably storing a reference image block, and a search control unit (CONT) 4. The block matching circuit 1 further has a Y pixel extraction unit (YPIX_SEL) 5, a pipeline arithmetic unit (PL_CAL) 6, and a minimum value holding unit (REG.) 7.

For example, in the block configuration of FIG. 3, the bit capacity in the Y direction stored in the target block memory 2 at a time is 32 bits corresponding to the number of pixels (32 pixels) of the search range of the macro block. Specifically, the target block memory 2 has a capacity in the Y direction (also referred to as a "bit direction") for 32 bits, which are the sum of the number of Y pixels to be selected (the number of pixels of the target image block, "16") and the number of pixels, "16" of the search width (−8 to 8 pixels) in the Y direction.

Data (bit) sampling in the Y direction of the search range is carried out by the Y pixel extraction unit 5, as described below. For this reason, the number of output bits in the Y direction of the target block memory 2 needs to be the number of bits (in this example (the example of FIG. 3), 32 bits) corresponding to the maximum value of the search range.

Meanwhile, data sampling in the X direction may be controlled by initialization of data to be stored in the minimum value holding unit 7, as described below. Therefore, it should suffice that the bit capacity in the X direction of the target block memory 2 is a natural number X (where $X \geq 1$) multiple of the number of gradation bits (for example, 8 bits) of one pixel. Insofar as this condition is satisfied, the bit capacity in the X direction to be stored in the target block memory 2 may be arbitrarily set.

The bit capacity in the X direction of the target block memory 2 may be determined depending on the search range of the macro block. For reference, the bit capacity in the X direction (word direction) of the target block memory 2 becomes, for example, the number of bits for 32 pixels of arbitrary pixel gradation values, for example, the number of bits, "256", for 32 pixels of eight gradations.

The reference block memory 3 has the bit capacity smaller than the target block memory 2 in each of the bit direction and the word direction so as to updatably store the reference image block. For reference, the bit capacity in the Y direction of the reference block memory 3 becomes 16 bits, and the bit capacity in the X direction of the reference block memory 3 becomes the number of bits for 16 pixels of arbitrary image gradation values, for example, the number of bits, "128", for 16 pixels of eight gradations.

The Y pixel extraction unit 5 is a portion to which the bit selection circuit 10 having the configuration shown in FIG. 1 is applied. The Y pixel extraction unit 5 reads out input bits of a 32-bit width from the target block memory 2, and obtains continuous output bits of a 16-bit width to be specified by a given control signal from among the input bits of a 32-bit width.

Though not particularly shown, the pipeline arithmetic unit 6 has a predetermined number of processor elements (PE). To each of the processor elements (PE), a one-bit output bit obtained from the Y pixel extraction unit 5 and a one-bit reference bit obtained from the reference block memory 3 are simultaneously input. Each processor element (PE) continuously carries out input of a pair of an output bit and a reference bit eight times to input two sets of eight-gradation bits for each pixel, and calculates the absolute difference in the gradation for each pixel from the two sets of eight-gradation bits. The same number of processor elements (PE) as by the number of pixels in the Y direction of the macro block, for example, 16 processor elements (PE) are provided, such that calculation of the absolute difference is carried out in parallel for the pixels.

In this way, calculation of the absolute difference for the pixels is executed in parallel for the 16 pixels in the Y direction of the macro block by the 16 processor elements (PE). In addition, parallel calculation for the absolute difference for the 16 pixels is continuously executed by the number of pixels (the number of words) in the X direction of the macro block, that is, 16 times.

Accordingly, with respect to one macro block of 16×16 pixels, calculation for the absolute difference ends.

With respect to one macro block, the absolute differences are accumulated for the number of pixels (for 256 pixels) constituting the block, and the sum of the absolute differences (Sum of Absolute Difference SAD) for each block is obtained.

Specifically, the absolute differences are accumulated, for example, for each of the pixel lines (16 pixels) of the Y direction, and the sum of the absolute differences for one pixel line is accumulated for 16 pixel lines to obtain the sum of the absolute differences (Sum of Absolute Difference SAD) of one block.

The above-described operation, that is, calculation of the sum of absolute difference SAD for each macroblock of 16×16 pixels is carried out each time the target block memory 2 changes the extraction position of the macro block of 16×16 pixels within the search range of 32×32 pixels. The number of macro blocks (the number of position vectors of the macro blocks) to be extracted within the search range is 289 {=(16+1)×(16+1)} in total when +8 bits and −8 bits exist in the Y direction and the X direction, respectively, that is, 16 pixels exist and the initial positions are included.

Therefore, with respect to the sum of absolute difference SAD, 289 values are obtained.

In this way, with respect to the sum of absolute difference SAD for one block, 289 values are sequentially obtained.

Since the sum of absolute difference SAD is obtained over the operation, the minimum value holding unit 7 determines whether or not the obtained sum of absolute difference SAD is the minimum, and if the sum of absolute difference SAD is the minimum, holds the sum of absolute difference SAD. Specifically, when the sum of absolute difference SAD is initially input, only the initial sum of absolute difference SAD is held without condition. Meanwhile, next to the initial sum of absolute difference, a new sum of absolute difference SAD is input, and the sum of absolute difference SAD(in) to be input is compared with the sum of absolute difference SAD (hold) held in the minimum value holding unit 7. Only when the input sum of absolute difference SAD(in) is smaller than the sum of absolute difference SAD(hold), a processing to substitute the sum of absolute difference being held with the input sum of absolute difference is executed.

Comparison of the sum of absolute difference SAD and value substitution may be executed through control of the minimum value holding unit 7 by the search control unit 4.

The above-described operation corresponds to one search operation. This search operation is repeated necessary times with a shift of the position of the macro block to be evaluated within the search range by a predetermined number of pixels.

During each search operation, the content held in the minimum value holding unit 7 is initialized (reset). For this reason, when one search operation ends, the sum of absolute difference SAD(hold) held in the minimum value holding unit 7 is the minimum evaluation value (minimum value) in the search operation.

The basis of the above-described operation is common to coarse-grain search and finest grain search. In the finest grain search, search is carried out finely more than the range, which is narrowed through fine-grain search to obtain the minimum evaluation value (minimum value) with good accuracy.

The search control unit 4 compares the address of the macro block when the final minimum value is obtained and the address of the reference block with reference to the absolute address in the image memory, and obtains the motion vector from a difference in the address.

The obtained motion vector is sent from the search control unit 4 to a subsequent-stage processing circuit (a circuit for compression or image stabilization), and is used in processing.

As will be apparent from the above operation, the search control unit 4 is connected to the target block memory 2, the reference block memory 3, the Y pixel extraction unit 5, the pipeline arithmetic unit 6, and the minimum value holding unit 7, and overall controls the operations of the respective units. The search control unit 4 is also connected to the main control circuit 20 shown in FIG. 2, and manipulates a shift operation based on input data at the time of coarse-grain search and finest grain search through control of the target block memory 2, the Y pixel extraction unit 5, the minimum value holding unit 7, and the like. In particular, the shift operation in the Y direction is controlled by application of a control signal from the search control unit 4 to the Y pixel extraction unit 5.

Next, the configuration of the bit selection circuit 10 shown in FIG. 1 that is suitably used as the Y pixel extraction unit 5 will be described in detail with reference to FIG. 5. It is assumed that the Y pixel extraction unit 5 shown in FIG. 4 extracts 16 continuous bits from 32 input bits. However, in the following description or the drawings, to avoid the complexity of the drawings, an example where 8 bits are selected from among 16 bits will be described. Since a difference in the number of bits is not essential, in any cases, the following description is analogized and applied insofar as, from among ($2^n$) input bits, ($2^{n-1}$) continuous output bits in the input bit arrangement are selected (where $n \geq 3$).

Figure 5:
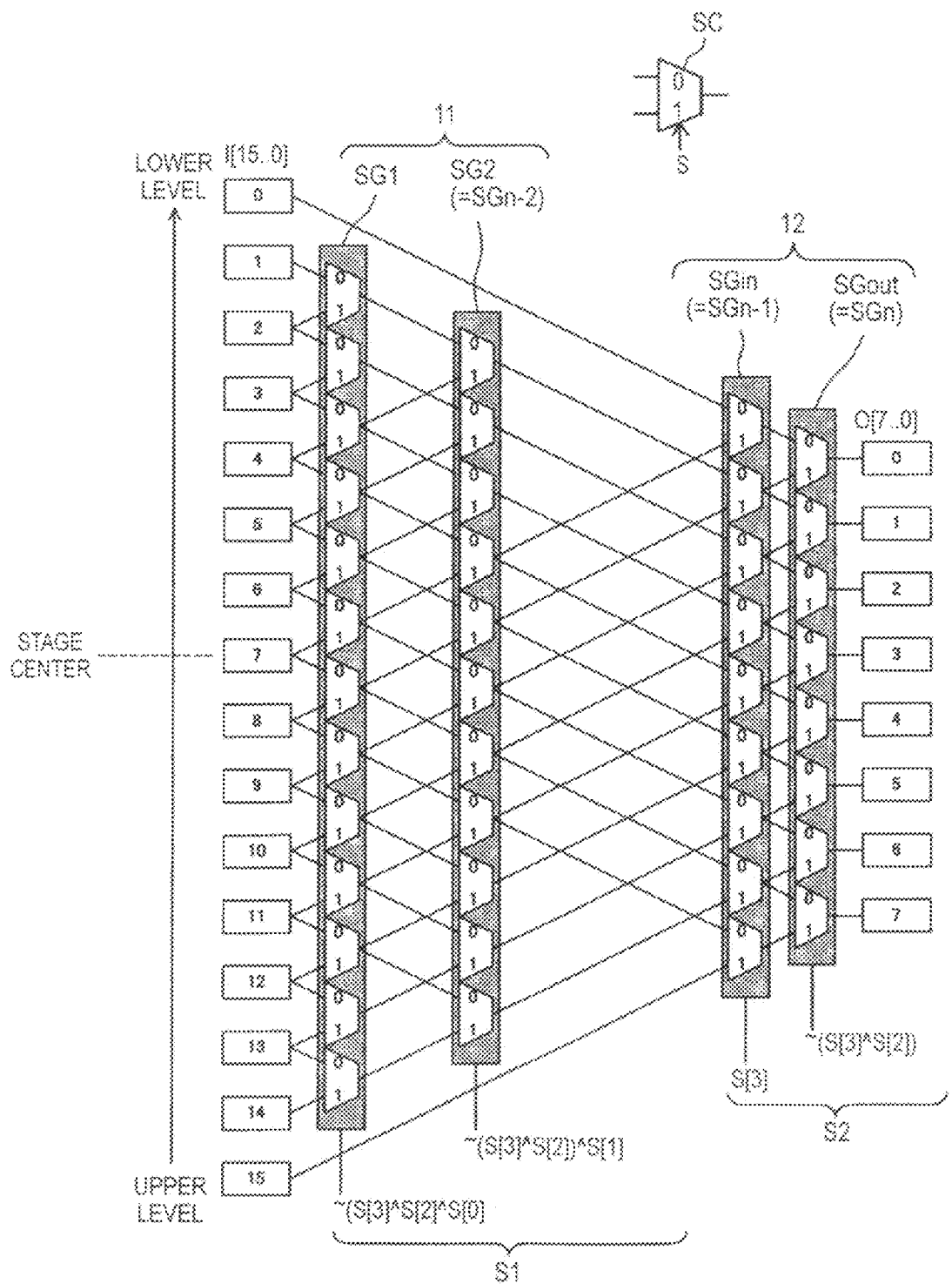
FIG. 5 is a circuit diagram showing a bit selection circuit according to Embodiment 2 of the invention.

FIG. 5 shows the configuration of a bit selection circuit 10A that, from among 16 input bits I[15 . . . 0], 8 continuous output bits O[7 . . . 0] in the input bit arrangement are obtained. The bit selection circuit 10A is a specific example of the bit selection circuit 10 shown in FIG. 1 (n=4), and it may be used in the Y pixel extraction unit 5 of FIG. 4.

The bit selection circuit 10A shown in FIG. 5 has 2:1 selection circuits SC that are arranged in n (where n=4) stages to select and output one of two input bits in accordance with a control signal. Of these, the first stage and the second stage form the first multiplexer 11 (FIG. 1), and the second stage and the fourth stage form the second multiplexer 12 (FIG. 1).

In the first multiplexer 11, an i-th stage (called a stage SGi, where i=1, 2, 3, and 4) has arranged therein ($2^n - 2^i - 1$) 2:1 selection circuits SC. Therefore, the number of 2:1 selection circuits in the stage SG1 (where i=1) is 13 (=16−2−1), and the number of 2:1 selection circuits in the stage SG2 (where i=2) is 11 (=16−4−1).

The second multiplexer 12 has an input stage (called an input stage SGin) corresponding to an (n−1)th stage (the third stage) in the whole stages, and an output stage (called an output stage SGout) corresponding to an n-th stage (the fourth stage) in the whole stages.

The input stage SGin that is the third stage (where i=3) in the whole stages has arranged therein ($2^n - 2^i + 1$)=(16−8+1)= 9) 2:1 selection circuits SC.

The output stage SGout has arranged therein ($2^{n-1}$) (=8) 2:1 selection circuits SC.

The stage SG1 is provided with input lines that are configured to receive adjacent two bits from among 14 input bits, excluding the lowermost bit I[0] and the uppermost input bit I[15]. Specifically, the input bit I[1] is applied to an input (hereinafter, called "0 input") which is selected when the control signal of a lower-level 2:1 selection circuit SC is "0", and an adjacent input bit I[2] is applied to an input (hereinafter, called "1 input") which is selected when the control signal of the corresponding 2:1 selection circuit SC is "1". As the position of each of the second, third, . . . 2:1 selection circuits SC when counted from the lower end are shifted one bit at a time, the input lines are configured to shift the input bits to be applied to the 0 input and the 1 input, respectively, one bit at a time.

The stage SG2 (where i=2) is provided with input lines that are configured to select one of two bits spaced with a ($2^{i-1}$)=2 pitch in the output bit arrangement of the stage SG1 in accordance with a control signal.

The input lines of the stage SG2 function as the output lines of the stage SG1. Therefore, the output lines of the stage SG1 between the third 2:1 selection circuit SC when counted from the lower end and the third 2:1 selection circuit SC from the upper end have a two-way shift configuration including a so-called left shift configuration for bit output in a lower side direction and a so-called right sift configuration for bit output in an upper side direction. Meanwhile, two 2:1 selection circuits SC on the lower side have only a right shift configuration and two 2:1 selection circuits SC on the upper side have only a left shift configuration. The two 2:1 selection circuits SC on each of the lower side and the upper side have only a one-way shift configuration.

In the lowermost 2:1 selection circuit SC of the input stage SGin, the lowermost input bit I[0] which is not used in the first multiplexer 11 is input to the 0 input. In the uppermost 2:1 selection circuit SC, the uppermost input bit I[15] which is not used in the first multiplexer 11 is input to the 1 input.

Each of the 2:1 selection circuits SC of the input stage SGin is provided with the input lines that are configured to receive two bits spaced with a pitch of four bits in the arrangement of the lowermost input bit I[0], the output bits (11 bits) of the stage SG2, and the uppermost input bit I[15] in that order. The input lines are configured such that, if the position of the 2:1 selection circuit SC is shifted one bit at a time, a pair of bits to be selected from the arrangement is shifted one bit at a time.

In the output stage SGout, the lines of each of the eight 2:1 selection circuits SC are configured to receive a pair of adjacent bits output from the input stage SGin and to output one of them in accordance with a control signal.

Next, an equation representing the bit selection operation in the 2:1 selection circuit SC and a control signal will be described.

FIG. 6 is a diagram showing the definition of input and output in the arrangement of 2:1 selection circuits SC in one stage.

On an assumption that n 2:1 selection circuits SC exist in one stage, and the address in the Y direction of the each of the n 2:1 selection circuits SC is y[n−1 . . . 0], the bit that is input to the "0 input" of each of the 2:1 selection circuits SC is represented by A[y], and the bit that is input to the "1 input" is represented by B[y]. The bit that is obtained in the output of each of the 2:1 selection circuits SC is represented by C[y].

With this bit expression, the operation of each of the 2:1 selection circuits SC is expressed by Equation 1.

$$C[(n-1) \ldots 0] = S?B[(n-1) \ldots 0]:A[(n-1) \ldots 0] \quad\quad 1$$

For Equation 1, symbol "S?B:A" is an arithmetic expression that represents the condition of the C language. In this case, when the logic of S ("1" or "0") is "1", selection of A is indicated, and when the logic of S is "0", selection of B is indicated.

FIG. 7 is a chart showing the relationship between the control signal S[3 . . . 0] and the output bits O[7 . . . 0] when n=4, that is, at the time of 16:8 bit selection.

The control signal S[3 . . . 0] has four bits, and the uppermost bit thereof is a sign bit, and a bit field thereof ([2 . . . 0]), excluding the uppermost bit, is a group of bits indicative of the absolute value representing the selection position from the stage center shown in FIG. 5. FIG. 7 shows the relationship between the bit pattern of the control signal and the input bit pattern, which is obtained as the output bits O[7 . . . 0].

As shown in FIG. 5, the actual control signal to be given to each stage may be expressed by using operators of the C language, for example, ~ (bit inversion) and ^ (bit difference).

For example, since the first control signal S1 to be given to the stage SG1 is expressed by ~(S[3]^S[2])^S[0], when S1= [1100], the bit difference between S[3](="1") and S[2] (="1") is "0", its inversion is "1", and the bit difference "0" and S[0] (="0") is "1". Therefore, the "1 input (B[y])" is selected.

Since the first control signal S1 to be given to the stage SG2 is expressed by ~(S[3]^S[2])^S[1], in the same manner, the "1 input (B[y])" is selected. Meanwhile, in the stage SG2 of the input stage SGin, because of S[3](="1"), the "1 input (B[y])" is selected.

With respect to the bit patterns of other control signals, if the arithmetic operation is executed in the same manner, it can be verified that FIG. 7 is correct.

As will be apparent from FIG. 7, it can be seen that the bit selection circuit 10A can arbitrarily control eight continuous bits in the input bit arrangement from 16 input bits in accordance with the input control signal.

The small circuit scale of the bit selection circuit 10A having such a configuration will be collectively described below after subsequent Embodiment 3.

Embodiment 3

In Embodiment 3, the configuration of the bit selection circuit 10A when the value n is 4 in Embodiment 2 is generalized.

Figure 8:
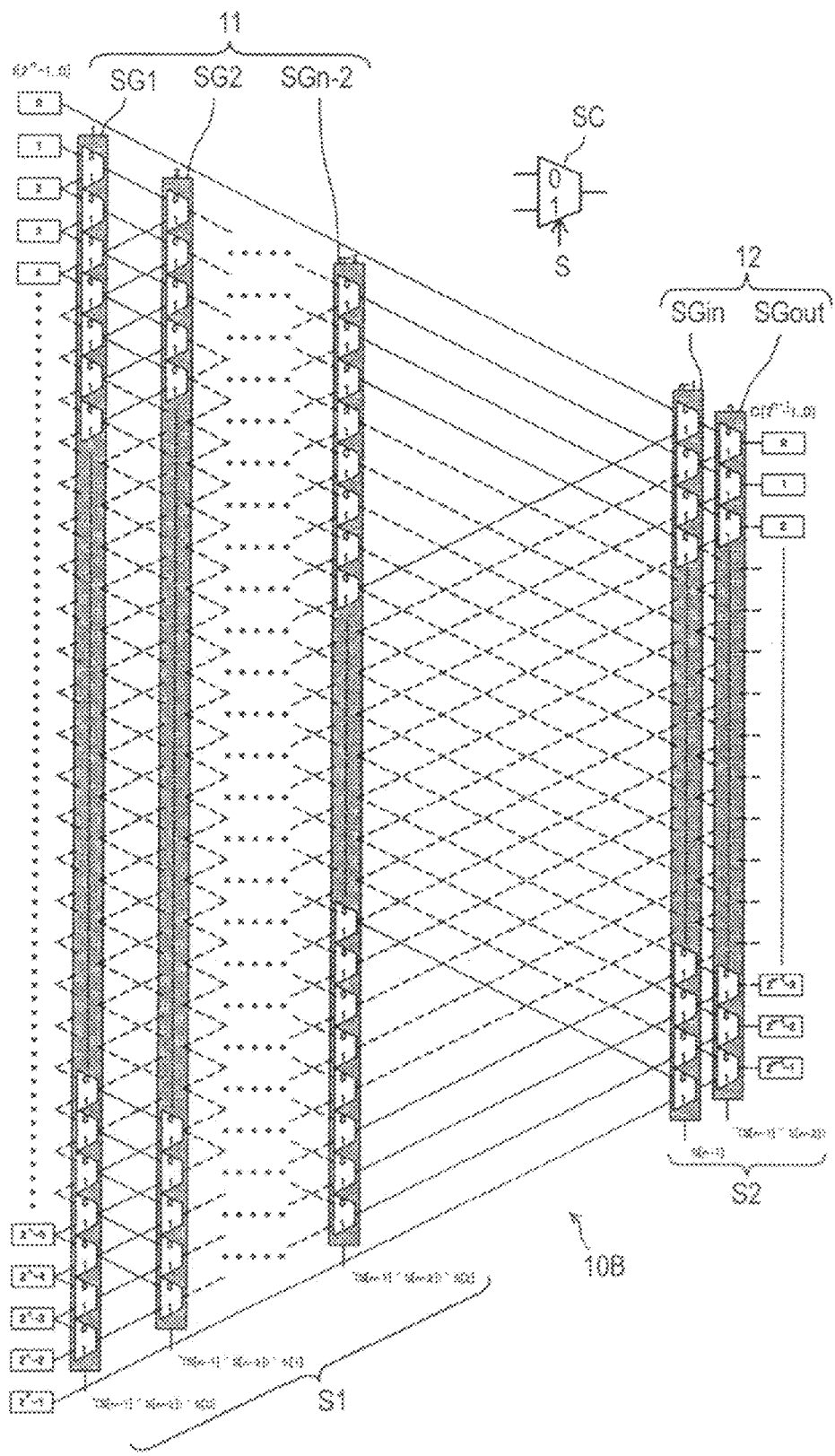
FIG. 8 is a circuit diagram showing generalized 2:1 selection circuits according to Embodiment 3 of the invention.

FIG. 8 shows a bit selection circuit 10B in which generalized n-stage 2:1 selection circuits are arranged in a tree shape.

Next, the number of 2:1 selection circuits SC in each stage and the connection relationship between the 2:1 selection circuits, which may be easily analogized from the description in connection with Embodiment 2, will be described.

The number of 2:1 selection circuits of an arbitrary i-th stage in the first multiplexer 11 is $(2^n-2^i-1)$ (where i=1, 2, . . . , n−2). Since the value n is a natural number of 3 or more, when n=3, the first multiplexer 11 has a one-stage configuration. Therefore, at least one stage is provided in the first multiplexer 11.

As described in connection with Embodiment 2, the second multiplexer 12 has the input stage SGin and the output stage SGout.

The input stage SGin has arranged therein $(2^n-2^{n-1}+1)$ 2:1 selection circuits SC that select one bit from among all the bits output from the first multiplexer 11, the lowermost first input bit, and the uppermost $(2^n)$th input bit, and output the selected one bit in accordance with the second control signal S2. The output stage SGout has arranged therein $(2^{n-1})$ 2:1 selection circuits SC that selects one bit from two bits output from two adjacent 2:1 selection circuits SC of the input stage SGin in accordance with the second control signal S2, and outputs the selected one bit as an output bit.

Connection between the 2:1 selection circuits SC may be easily analogized as follows from the description of Embodiment 2.

In the first multiplexer 11, in the arrangement of $(2^n-2^i-1)$ 2:1 selection circuits SC constituting an i-th stage, interstage connection of the 2:1 selection circuits between the $(2^i)$th 2:1 selection circuit SC when counted from one end (for example, the lower end) and the $(2^i)$th 2:1 selection circuit SC when counted from the other end (for example, the upper end) is made by two input lines, which are configured to receive two adjacent input bits (in the first stage (stage SG1)) or two bits output from two 2:1 selection circuits spaced with a $(2^{i-1})$ pitch in the previous stage (in another stage), an output line, which has a two-way shift configuration to simultaneously output the selected one bit to two 2:1 selection circuits spaced with a $(2^i)$ pitch in the subsequent stage and functions as one of the input lines with respect to each of 2:1 selection circuits as shift destinations in the corresponding subsequent stage.

In the first multiplexer 11, in the arrangement of the $(2^n-2^i-1)$ 2:1 selection circuits constituting the i-th stage, interstage connection of $\{(2^i-1)\times 2\}$ 2:1 selection circuits SC at both ends in the i-th stage may be made by the two input lines and an output line, which has a one-way shift configuration to output the selected one bit to one 2:1 selection circuit SC in one way in a subsequent stage and functions as the input lines, together with the output line.

In the second multiplexer 12, if the lowermost input bit, the $(2^n-2)$ bits output from the final stage of the first multiplexer 11, and the uppermost input bit are arranged in that order, the input lines of each of the $(2^n-2^{n-1}+1)$ 2:1 selection circuits SC constituting the input stage (the input stage SGin) are configured to receive two bits spaced with a pitch of four bits in the corresponding arrangement.

In the second multiplexer 12, the input lines of each of the $(2^{n-1})$ 2:1 selection circuits SC constituting the output stage (the output stage SGout) are configured to receive two bits, which are output from two adjacent 2:1 selection circuits SC in the input stage.

The bit selection operation of each of the 2:1 selection circuits SC is expressed by Equation 1, and is given on the basis of a control signal S[(n-1) . . . 0] expanded from the control signal S[3 . . . 0] shown in FIG. 7 by an expression regarding a control signal shown in FIG. 8.

Figure 9:
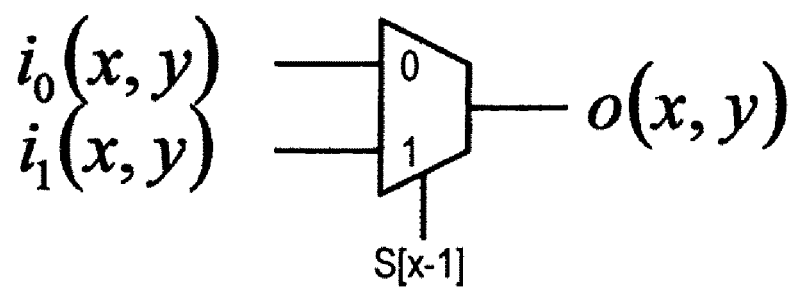
FIG. 9 is a definition diagram of input and output of 2:1 selection circuits in a first multiplexer according to Embodiment 3 of the invention.

With respect to the 2:1 selection circuits SC of the first multiplexer 11, input and output are defined as shown in FIG. 9. With respect to the 2:1 selection circuits SC of the second multiplexer 12, input and output are defined as shown in FIG. 10.

Figure 10:
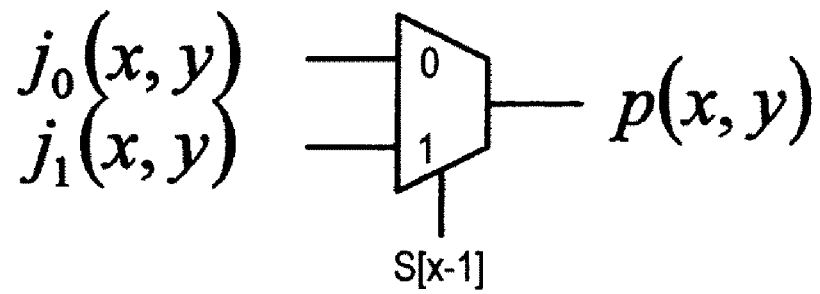
FIG. 10 is a definition diagram of input and output of 2:1 selection circuits in a second multiplexer according to Embodiment 3 of the invention.

In FIGS. 9 and 10, the number of stages of the stage SG is represented by an x address, and the position of the 2:1 selection circuit SC is represented by a y address.

Hereinafter, the connection relationship between the 2:1 selection circuits SC will be described using the input and output expression.

With respect to the first multiplexer 11, the data inputs, excluding two data inputs of the 2:1 selection circuits SC at both ends, from the first stage (stage SG1) to the (n−2)th stage (stage SGn−2) are connected to the output as expressed by Equation 2 (the 0 input side) and Equation 3 (the 1 input side)

$$i_0(x, y) = o(x - 1, y) \qquad 2$$

$$\begin{cases} 0 < x \le n - 1 \\ 0 < y \le 2^n - \left(\sum_{k=x}^{0} 2^k + 2\right) \end{cases}$$

$$i_1(x, y) = o(x - 1, y + 2^{x-1}) \qquad 3$$

$$\begin{cases} 0 < x \le n - 1 \\ 0 < y \le 2^n - \left(\sum_{k=x}^{0} 2^k + 2\right) \end{cases}$$

Therefore, a two-way shift configuration that shares a 2:1 selection path constituting right shift and left shift of data inputs is formed.

With respect to the second multiplexer 12, the data inputs from the 2:1 selection circuits SC of the (n−1)th stage (input stage SGin) to the 2:1 selection circuits SC of the n-th stage (output stage SGout), and two data inputs at both ends are connected to the output as expressed by Equation 4 (the 0 input sides of the (n−1)th stage and the n-th stage), Equation 5 (the 1 input side of the (n−1)th stage), and Equation 6 (the 1 input side of the n-th stage).

$$j_0(x, y) = p(x-1, y) \quad \quad 4$$
$$\begin{cases} n-2 < x \leq n \\ 0 < y \leq 2^{n-1} + (n-x) \end{cases}$$

$$j_1(x, y) = p(x-1, y+2^{x-1}) \quad \quad 5$$
$$\begin{cases} x = n-1 \\ 0 < y \leq 2^{n-1} + 1 \end{cases}$$

$$j_1(x, y) = p(x-1, y+1) \quad \quad 6$$
$$\begin{cases} x = n \\ 0 < y \leq 2n^{n-1} \end{cases}$$

That is, it is determined whether or not the data inputs include data inputs at both ends, and selection by a shift direction is controlled.

Figure 11:
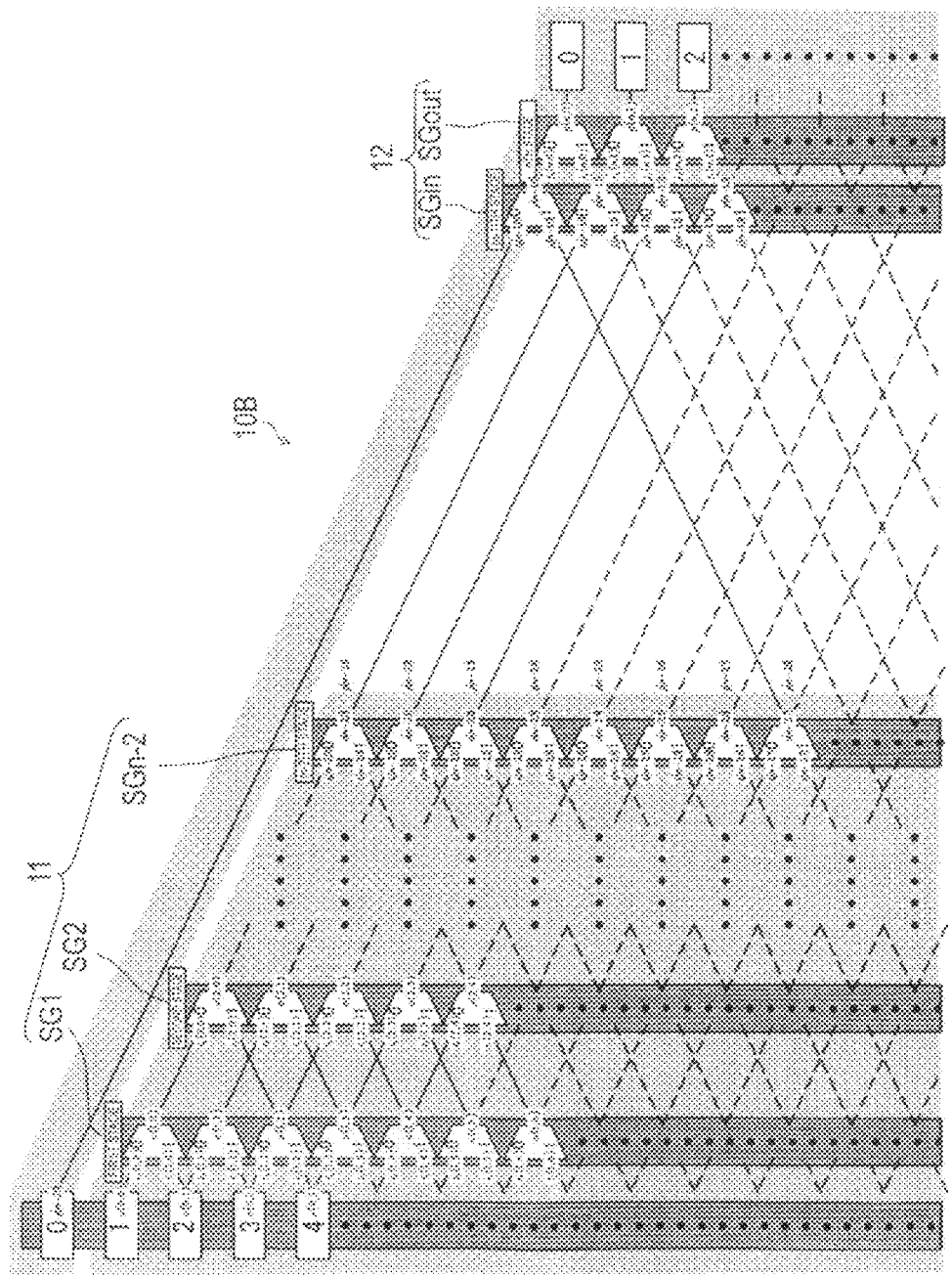
FIG. 11 is a partially enlarged view of FIG. 6 showing connection of input and output according to Embodiment 3 of the invention.

The connection relationship between input and output expressed by Equations 2 to 6 is shown in FIG. 11, which is a partially enlarged view of FIG. 8. In FIG. 11, p(x−2, y) represents the input bits having arranged the lowermost bit, the output bits from the final stage from the first multiplexer 11, and the uppermost bit in that order to the second multiplexer 12.

The effect (area reduction effect of bit selection circuit) of the foregoing Embodiments 1 to 3 will be described.

Like Embodiment 2, when n=4, in the case of a tree structure (the circuit of the first comparative example), a larger number of 2:1 selection circuits SC than the number of input bits by one are disposed in the first stage, and the number of 2:1 selection circuits SC is reduced along the subsequent stages, the number of 2:1 selection circuits SC being used becomes 60.

Figure 12:
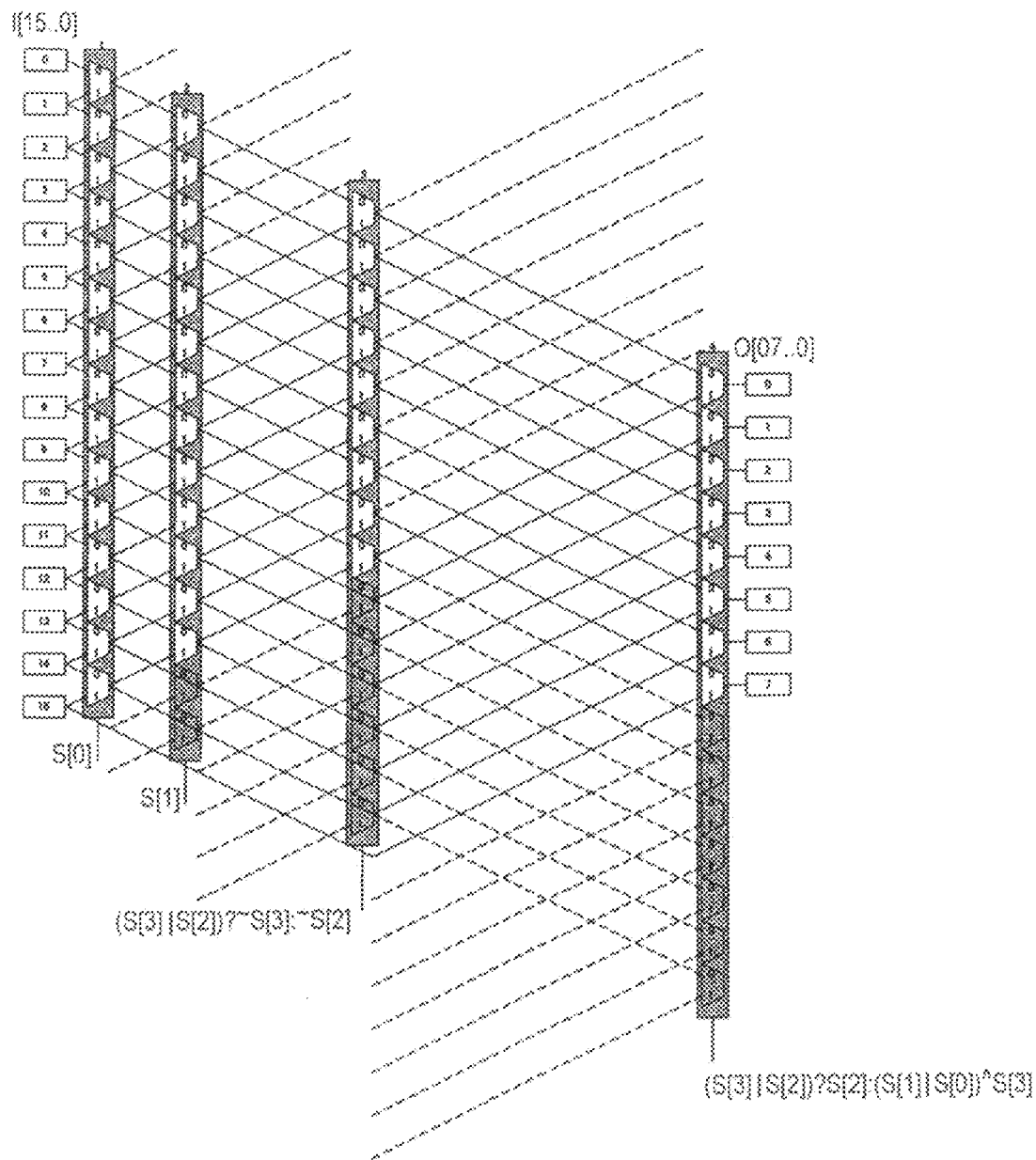
FIG. 12 is a circuit diagram of a second comparative example with respect to the embodiment of the invention.

The circuit of the first comparative example may retract the 2:1 selection circuits SC on the condition of the selection range, as shown in FIG. 12 (a circuit of a second comparative example). In this case, the number of 2:1 selection circuits SC being used is 45.

In the circuit of the second comparative example, a considerable scale reduction effect is obtained due to optimization. In contrast, in this embodiment, when the circuit is divided into the first multiplexer 11 and the second multiplexer 12, the number of 2:1 selection circuits being used is 41, and a further scale reduction effect is achieved.

The circuits may be generalized and expressed as follows. In the circuit of the first comparative example, the total number of 2:1 selection circuits SC is expressed by Equation 7. In the circuit of the second comparative example, the total number of 2:1 selection circuits is expressed by Equation 8. In the bit selection circuit 10B of Embodiment 3, the total number of 2:1 selection circuits SC is expressed by Equation 9.

$$(2^n - 2^0) \times n \quad \quad 7$$

$$(2^n - 2^0) + (2^n - (2^0 + 2^1)) \ldots + (2^n - (2^0 + 2^1 \ldots + 2^{n-2})) + 2^{n-1} \quad \quad 8$$

$$(2^n - 2^0 - 2) + (2^n - (2^0 + 2^1) - 2) \ldots + (2^n - (2^0 + 2^1 \ldots + 2^{n-3}) - 2) + (2^n - (2^0 + 2^1 \ldots + 2^{n-2})) + 2^{n-1} \quad \quad 9$$

Since the difference between Equation 9 and Equation 8 becomes $(2^n - 2^0) \times n$, it can be seen that, as the number of input bits is larger, the reduction effect of the circuit scale rapidly increases. Therefore, with reduction of the circuit mount area, reduction in the costs and low power consumption can be achieved.

The structure of the selection circuit according to the embodiments of the invention is symmetric in the bit direction, and thus it is suitable for physical arrangement.

The present application contains subject matter related to that disclosed in Japanese Priority Patent Application JP 2008-184205 filed in the Japan Patent Office on Jul. 15, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A bit selection circuit that arbitrarily selects, from among ($2^n$) input bits, ($2^{n-1}$) continuous output bits in the input bit arrangement (where n≧3), the bit selection circuit comprising:
   a first multiplexer selecting $\{(2^n-2)-(2^0+2^1+ \ldots +2^{n-3})\}$ continuous bits in the input bit arrangement from among ($2^n-2$) input bits, excluding two first and ($2^n$)th input bits at both ends in the input bit arrangement, in accordance with an input first control signal; and
   a second multiplexer selecting ($2^{n-1}$) continuous output bits in the input bit arrangement from among the $\{(2^n-2)-(2^0+2^1+ \ldots +2^{n-3})\}$ bits selected by the first multiplexer, the first input bit, and the ($2^n$)th input bit in accordance with an input second control signal,
   wherein the first multiplexer is an at least one-stage barrel shift selection circuit, the i-th stage (where i=1, 2, ..., n−2) of which has arranged therein ($2^n-2^{i-1}-1$) 2:1 selection circuits, each 2:1 selection circuit selecting one bit from among two bits of the input bits or two bits, which are output from a previous stage, in accordance with the first control signal and outputting the one bit to a subsequent stage, and
   the second multiplexer has
     an input stage having arranged therein ($2^n-2^{n-1}+1$) 2:1 selection circuits selecting one bit from among all the bits, which are output from the first multiplexer, the first input bit, and the ($2^n$)th input bit in accordance with the second control signal and outputting the one bit, and
     an output stage having arranged therein ($2^{n-1}$) 2:1 selection circuits, each 2:1 selection circuit selecting one bit from among two bits, which are output from two adjacent 2:1 selection circuits in the input stage, in accordance with the second control signal and outputting the one bit as one of the output bits.

2. The bit selection circuit according to claim 1, wherein in the arrangement of the ($2^n-2^i-1$) 2:1 selection circuits constituting the i-th stage of the first multiplexer, interstage connection of 2:1 selection circuits between a ($2^n$)th 2:1 selection circuit when counted from one end and a ($2^i$)th 2:1 selection circuit when counted from the other end is made by two input lines, which are configured to individually receive two adjacent input bits or two bits to be output from two 2:1 selection circuits spaced with a $(2^{i-1})$ pitch in a previous stage, and an output line, which has a two-way shift configuration to simultaneously output the selected one bit to two 2:1 selection circuits spaced with a $(2^i)$ pitch in a subsequent stage and functions as one of the input lines with respect to each of 2:1 selection circuits as shift destinations in the corresponding subsequent stage, and interstage connection of $\{(2^i-1)\times 2\}$ 2:1 selection circuits at both ends in the i-th stage is made by the two input lines and an output line, which has a one-way shift configuration to output the selected one bit to one 2:1 selection circuit in one way in a subsequent stage and functions as the input lines, together with the output line.

3. The bit selection circuit according to claim 1, wherein, if the first input bit, the $(2^n-2)$ bits output from the final stage of the first multiplexer, and the $(2^n)$th input bit are arranged in that order, the input lines of each of the $(2^n-2^{-1}+1)$ 2:1 selection circuits constituting the input stage of the second multiplexer are configured to receive two bits spaced with a pitch of four bits in the corresponding arrangement, and the input lines of each of the $(2^n)$ 2:1 selection circuits constituting the output stage of the second multiplexer are configured to receive two bits, which are output from two adjacent 2:1 selection circuits in the input stage.

4. The bit selection circuit according to claim 2, wherein, if the first input bit, the $(2^n-2)$ bits output from the final stage of the first multiplexer, and the $(2^n)$th input bit are arranged in that order, the input lines of each of the $(2^n-2^{n-1}+1)$ 2:1 selection circuits constituting the input stage of the second multiplexer are configured to receive two bits spaced with a pitch of four bits in the corresponding arrangement, and the input lines of each of the $(2^{n-1})$ 2:1 selection circuits constituting the output stage of the second multiplexer are configured to receive two bits, which are output from two adjacent 2:1 selection circuits in the input stage.

* * * * *